(12) United States Patent
Hammond et al.

(10) Patent No.: US 6,262,555 B1
(45) Date of Patent: Jul. 17, 2001

(54) APPARATUS AND METHOD TO GENERATE BRAKING TORQUE IN AN AC DRIVE

(75) Inventors: Peter W. Hammond, Hempfield, Westmoreland; Mukul Rastogi, Monroeville, Allegheny, both of PA (US)

(73) Assignee: Robicon Corporation, New Kensington, PA (US)

( * ) Notice: Subject to any disclaimer, the term of this patent is extended or adjusted under 35 U.S.C. 154(b) by 0 days.

(21) Appl. No.: 09/386,677

(22) Filed: Aug. 31, 1999

Related U.S. Application Data

(60) Provisional application No. 60/102,977, filed on Oct. 2, 1998.

(51) Int. Cl.[7] .................................................. H02P 3/18
(52) U.S. Cl. ......................... 318/759; 318/375; 318/807
(58) Field of Search ................................. 318/375, 376, 318/377, 378, 798–803, 807, 808, 810, 811, 757, 759, 760, 762

(56) References Cited

U.S. PATENT DOCUMENTS

| | | |
|---|---|---|
| 3,607,507 | 9/1971 | Beck . |
| 3,628,114 * | 12/1971 | Pattantyus . |
| 4,039,925 | 8/1977 | Fletcher et al. . |
| 4,142,136 | 2/1979 | Witter . |
| 4,150,425 | 4/1979 | Nagano et al. . |
| 4,201,938 | 5/1980 | Neumann . |
| 4,301,489 | 11/1981 | Stich . |
| 4,319,177 | 3/1982 | Kawada et al. . |
| 4,417,193 | 11/1983 | Hirata . |
| 4,426,610 | 1/1984 | Kawada et al. . |
| 4,426,611 | 1/1984 | Espelage et al. . |
| 4,434,393 | 2/1984 | Kobari et al. . |
| 4,449,086 * | 5/1984 | Hoffmann et al. .................. 318/696 |
| 4,634,951 | 1/1987 | Kampf et al. . |
| 4,673,858 | 6/1987 | Saito . |
| 4,678,980 * | 7/1987 | Sugimoto et al. .................. 318/759 |
| 4,698,738 | 10/1987 | Miller et al. . |

(List continued on next page.)

FOREIGN PATENT DOCUMENTS

| | | |
|---|---|---|
| 0 597 409 A1 | 5/1994 | (EP) . |
| 0 451 750 B1 | 1/1995 | (EP) . |
| 0 782 784 B1 | 2/1998 | (EP) . |
| 0 782 783 B1 | 6/1998 | (EP) . |
| 45-2703 | 1/1970 | (JP) . |
| 6-141559 | 5/1994 | (JP) . |
| 8-317693 | 11/1996 | (JP) . |
| 10-162945 | 6/1998 | (JP) . |
| 10-172746 | 6/1998 | (JP) . |

OTHER PUBLICATIONS

ABB Industrie AG Product Brochure titled ACS 1000 Drive Description, 1997.
ABB Industrie AG Product Brochure titled The ACS 1000 is performance simplified, 1997.
"A New 24–Pulse Diode Rectifier System for AC Motor Drives Provides Clean Power Utility Interface with Low kVA Components," Lee et al., *IEEE*, 1996, pp. 1024–1031, 0–7803–3544–9.

(List continued on next page.)

*Primary Examiner*—Bentsu Ro
(74) *Attorney, Agent, or Firm*—Buchanan Ingersoll

(57) ABSTRACT

A device and control method to produce braking torque counter to motor rotation. A converter supplies multiple frequency AC power to the motor. A first frequency is supplied at the normal operating frequency/speed. A second frequency, different from the normal operating frequency, is supplied to produce braking torque. The level of braking can be controlled to generally consume some or all of the braking in the device or motor. More than one braking frequency may be utilized. In addition, the relationship between the normal and braking frequency(s) can be maintained to limit motor pulsation.

42 Claims, 11 Drawing Sheets

U.S. PATENT DOCUMENTS

| | | |
|---|---|---|
| 4,788,635 | 11/1988 | Heinrich . |
| 4,843,296 | 6/1989 | Tanaka . |
| 4,928,052 | 5/1990 | Fujioka et al. . |
| 4,943,890 | 7/1990 | Schaltenbrand et al. . |
| 4,965,847 * | 10/1990 | Jurkowski et al. .................. 388/814 |
| 5,003,242 | 3/1991 | Liber . |
| 5,005,115 | 4/1991 | Schauder . |
| 5,008,797 | 4/1991 | Patel et al. . |
| 5,047,913 | 9/1991 | DeDoncker et al. . |
| 5,073,848 | 12/1991 | Steigerwald et al. . |
| 5,179,510 | 1/1993 | Tokiwa et al. . |
| 5,319,536 | 6/1994 | Malik . |
| 5,517,464 * | 5/1996 | Lerner et al. .......................... 367/84 |
| 5,594,636 | 1/1997 | Schauder . |
| 5,619,407 | 4/1997 | Hammond . |
| 5,625,545 | 4/1997 | Hammond . |
| 5,638,263 | 6/1997 | Opal et al. . |
| 5,646,498 | 7/1997 | Lipo et al. . |
| 5,708,576 | 1/1998 | Jones et al. . |
| 5,729,113 | 3/1998 | Jansen et al. . |
| 5,764,499 | 6/1998 | Klug et al. . |
| 5,808,882 | 9/1998 | Mochikawa . |

OTHER PUBLICATIONS

"Current Stiff Converter Topologies with Resonant Snubbers," Filho et al., Research Report No. 97–22, University of Wisconsin–Madison College of Engineering, 1997.

"Displacement Angle Control of Matrix Converter," Oyama et al., *IEEE*, 1997, 0–7803–3843–X/97.

"Dynamic Braking of Induction Motors," C. Grantham, *Journal of Electrical and Electronics Engineering, Australia* IE Aus. & IREE Aust. vol. 6, No. 3, Sep. 1986.

"Dynamic Performance and Control of a Static Var Generator Using Cascade Multilevel Inverters," Peng et al., *IEEE Transactions of Industry Applications*, vol. 33, No. 3, May/Jun. 1997, pp. 748–755.

"Electrodynamical Phenomenon in a System Voltage Inverter–Induction Machine by the Loss of D.C. Supply Voltage," Zdenek et al., *ACTA Technica CSAV*, Oct., 1979, pp. 431–447.

"High Performance Current Control Techniques for Applications to Multilevel High–Power Voltage Source Inverters," Mario Marchesoni, *IEEE Trrransactions on Power Electronics*, vol. 7, No. 1, Jan., 1992.

"Resonant Snubbers with Auxiliary Switches," William McMurray, IEEE/IAS Ann. Meet. Conf. Rec., 1989 pp. 829–834.

"Synthetic Loading of Machines, " Spooner et al., Electrical Energy Conference, 1986, Brisbane Oct. 20–22, 1986, pp. 194–297.

"Use of a LC Filter to Achieve a Motorfriendly Performance of the PWM Voltage Source Inventor," Steinke et al., *IEEE*, 1997, pp. TA2–4.1 to TA2–4.3, 0–7803–3946–0.

"Utilisation de Transistors A Fort Courant et Tension Elevee," Bingen et al., University of Brussels, Feb. 17, 1995.

"Voltage Stress on Induction Motors in Medium–Voltage Drives," Wu et al., *IEEE Transactions of Power Electronics*, vol. 12, No. 2, Mar. 1997, pp. 213–220.

* cited by examiner

Losses in a 1000 HP, 4kv, 60 HZ, 4-pole motor spinning forward at 1800 RPM, with reverse voltage applied for rated amps.

Percent of rated current (Imax = 100%)

Percent of rated speed

Percent of rated torque (Imax = 100%)

Percent of rated speed

Legend and scaling for the two plots.
Channel 1: Voltage command to modulator at 5 volts per division (8.8V=100%)
Channel 2: Speed estimate at 4 volts per division (7.5V=100%)
Channel 3: Motor current at 4 volts per division (1V=6.6A)

Legend and scaling for the two plots.
Channel 1: Voltage command to modulator at 5 volts per division (8.8V=100%)
Channel 2: Speed estimate at 4 volts per division (7.5V=100%)
Channel 3: Motor current at 4 volts per division (1V=6.6A)

APPARATUS AND METHOD TO GENERATE BRAKING TORQUE IN AN AC DRIVE

RELATED APPLICATION

This application is based on provisonal application Ser. No. 60/102,977, filed Oct. 2, 1998.

BACKGROUND OF THE INVENTION

This invention relates to the braking of a motor and its associated load in an AC motor drive. The motor drive uses an adjustable frequency control for at least a portion of the control of an AC motor. It is particularly adaptable to non-regenerative types of drives.

Variable frequency drives have often been used to vary the speed of an AC induction motor. Such drives can operate from a fixed frequency AC power available from an electrical utility to create variable frequency output power to the motor. Such drives can utilize power semiconductors controlled as ON or OFF switches to provide an adjustable speed control. Many of these drives can only accommodate power flow into the motor. As a result they cannot provide regenerative braking. Of the non-regenerative drives, many utilize a two-stage power conversion. The first stage converts AC input power to an intermediate DC source. The second stage uses semiconductor switches to act as an inverter converting the DC power to an adjustable frequency AC output. It is common that the second or output DC to AC conversion stage is capable of passing rated power in either direction. However, quite often the circuits used in the first or input AC to DC conversion stage are only capable of passing power in one direction, namely from the incoming AC line to the DC link output.

In many cases, the application of the motor drive requires occasional power flow in the opposite direction, for example to brake or decelerate a high inertia load. In such cases, it is common practice to add a power resistor and another semiconductor switch in a dynamic braking arrangement. In that arrangement the switch can connect the resistor across the DC link voltage to absorb the returning energy from the DC to AC conversion. Dynamic braking utilizes a resistor which absorbs the energy that has been stored in the motor and load inertia. The energy from the load is converted into heat in the resistor. Regenerative braking, using resistors, requires a high current switch which may be composed of semiconductors and a resistor of sufficient size to absorb the generated heat.

In other approaches where motor braking is required, the control can be designed to regenerate braking power, by feeding the power back into the AC incoming line. In such cases where there is an input AC to DC converter, the AC to DC converter can be designed using additional semiconductors switches to make the converter capable of passing power in both directions. However, this method is also more costly as it requires additional switching devices to handle high current. Because higher powered drives generally utilize three-phase current, the above methods of providing braking can require a larger number of switches since it is desired to balance all three phases. Such dynamic braking or regenerative braking can be costly because of the need for additional power circuit elements.

When the reverse power flow requirement is infrequent or modest, some drives have avoided these costs by utilizing the power supply output current at a zero frequency, in essence DC power to the motor windings. This creates a stationary magnetic field in the motor air gap. When the spinning rotor windings interact with this field, voltage is induced in the windings which causes rotor current to flow. The rotor currents in turn interact with the magnetic field to produce negative braking torque. Such an approach is sometimes called "DC injection braking." In drives where the control functions are performed in a microprocessor guided by software, DC injection adds no additional components and adds little to the cost of the basic drive. However, there are two specific drawbacks to DC injection braking. The first drawback is that the available torque at high speeds is quite low. This is due to the high slip in the motor and the consequential poor torque available per ampere. For example, if the injected DC current is limited to 100% of the motor rated current (to protect the drive), the torque produced at rated speed can be as low as 3% of the motor rated torque. The second drawback is that the control cannot estimate the motor's speed while DC injection is occurring; so that if a sudden return to forward torque is desired while the motor is spinning, a delay is needed to redetermine the motor speed before an accelerating adjustable frequency AC voltage can again be applied to the motor terminals. DC injection braking is, therefore, not desirable where high braking torque levels are required at or near normal operating speed, nor where it is desired only to brake the motor to a lower non-zero operating speed.

This invention to brake an AC electric motor relates to an electrical means to provide the braking torque as opposed to mechanical or friction braking. An object of the invention can be to provide an electrical braking scheme which can be to provide high levels of braking torque at rated speed. Another object of the invention can be to provide braking torque in non-regenerative converters, without the necessity of using additional costly semiconductor devices. Another object of the invention can be to provide a means to dissipate the braking energy as heat, without the need for dynamic braking resistors. The subject of the invention is to provide a high torque electrical braking method which can be utilized infrequently as a means to reduce the speed of the motor.

Certain preferred embodiments of the invention utilize at least one power conversion unit having an input AC to DC converter, and a DC to adjustable frequency AC output converter. One such type of drive is described in U.S. Pat. No. 5,625,545; and this patent is hereby incorporated by reference.

In some prior art test apparatus (for example Grantham et al.; "Dynamic Braking of Induction Motors", Journal of Electrical and Electronics Engineering Australia, Vol. 6, No. 3, September 1986) multiple frequencies are applied to an AC motor to simulate load during testing. Such test apparatus does not use the multiple frequencies injected to control the speed of a motor such as to brake the speed of a rotating rotor to a lower speed or stop.

Others, specifically Jansen et al in U.S. Pat. No. 5,729, 113, utilize two frequencies in a PWM control for speed sensing and calculation.

SUMMARY OF THE INVENTION

When it is desired to reduce the speed of an AC motor by applying braking torque from a variable frequency drive, the usual methods utilize dynamic braking with a resistor, or a regenerative power circuit. The invention includes providing braking torque to an AC motor by simultaneously applying two different frequencies to the motor when braking is desired. The result is that the energy used to brake the motor/load inertia is dissipated in the motor itself. No external braking resistor is required, nor is a full regenerative power circuit required. It is particularly desirable when utilized with a non-regenerative power circuit. Torque pulsations are produced at the difference between the normal frequency and the loss-inducing braking frequency, but with proper control this can be maintained at a generally constant pulsation frequency. The pulsation frequency may be chosen to be non-critical, and may be adjustable to "tune" the braking control to specific apparatus. In drives having a controllable output, the amount of braking can also be controlled. The invention permits motor speed to be estimated even during braking operation.

DESCRIPTION OF THE DRAWINGS

FIG. 1a shows a modular adjustable frequency AC drive circuit for higher power levels, similar to that shown in U.S. Pat. No. 5,625,545. However, FIG. 1a includes controls to provide electrical braking to the induction motor.

FIG. 1b shows details of the power cells of FIG. 1a.

DESCRIPTION OF EMBODIMENTS

Figure 1:
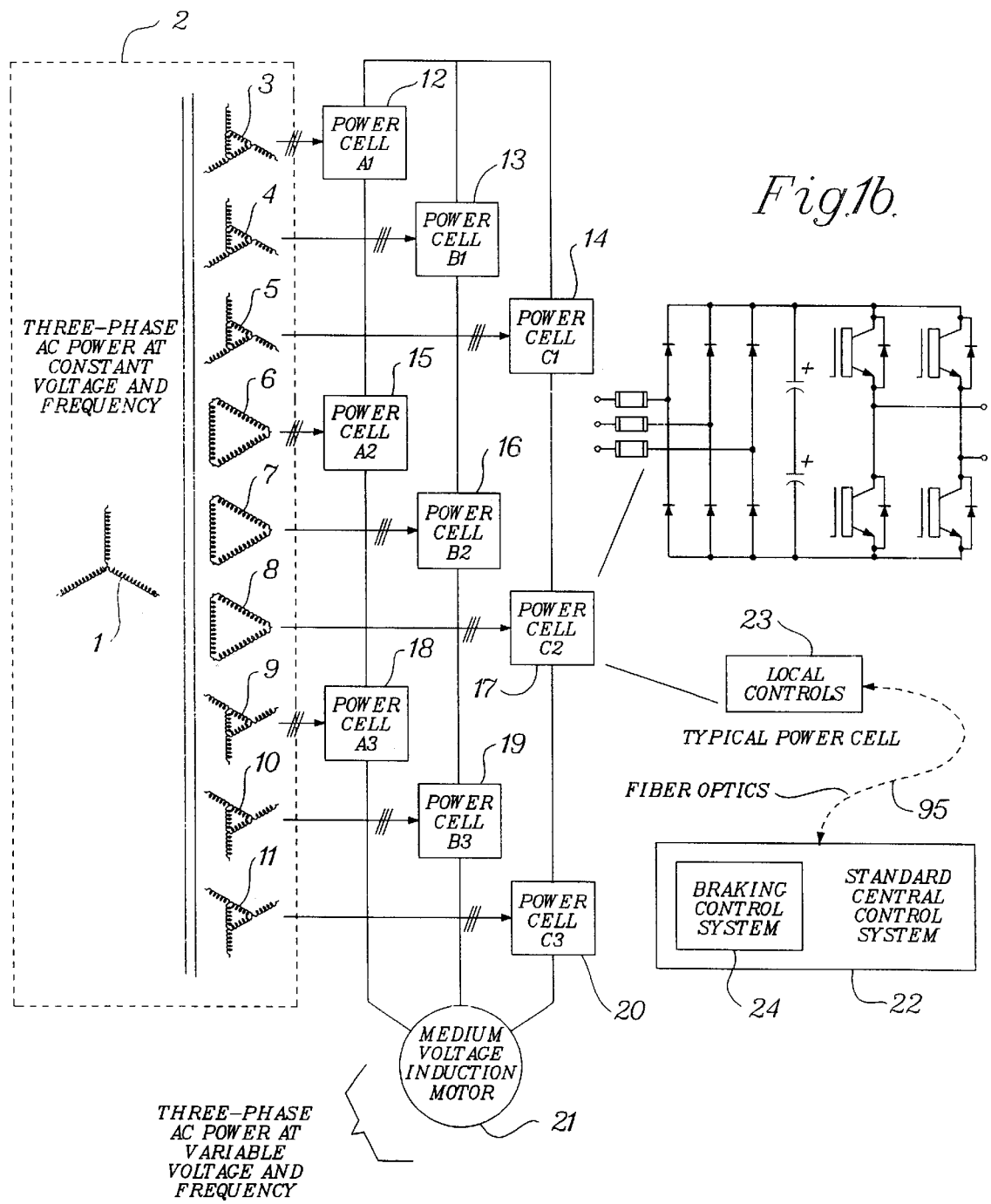
Figure 2:
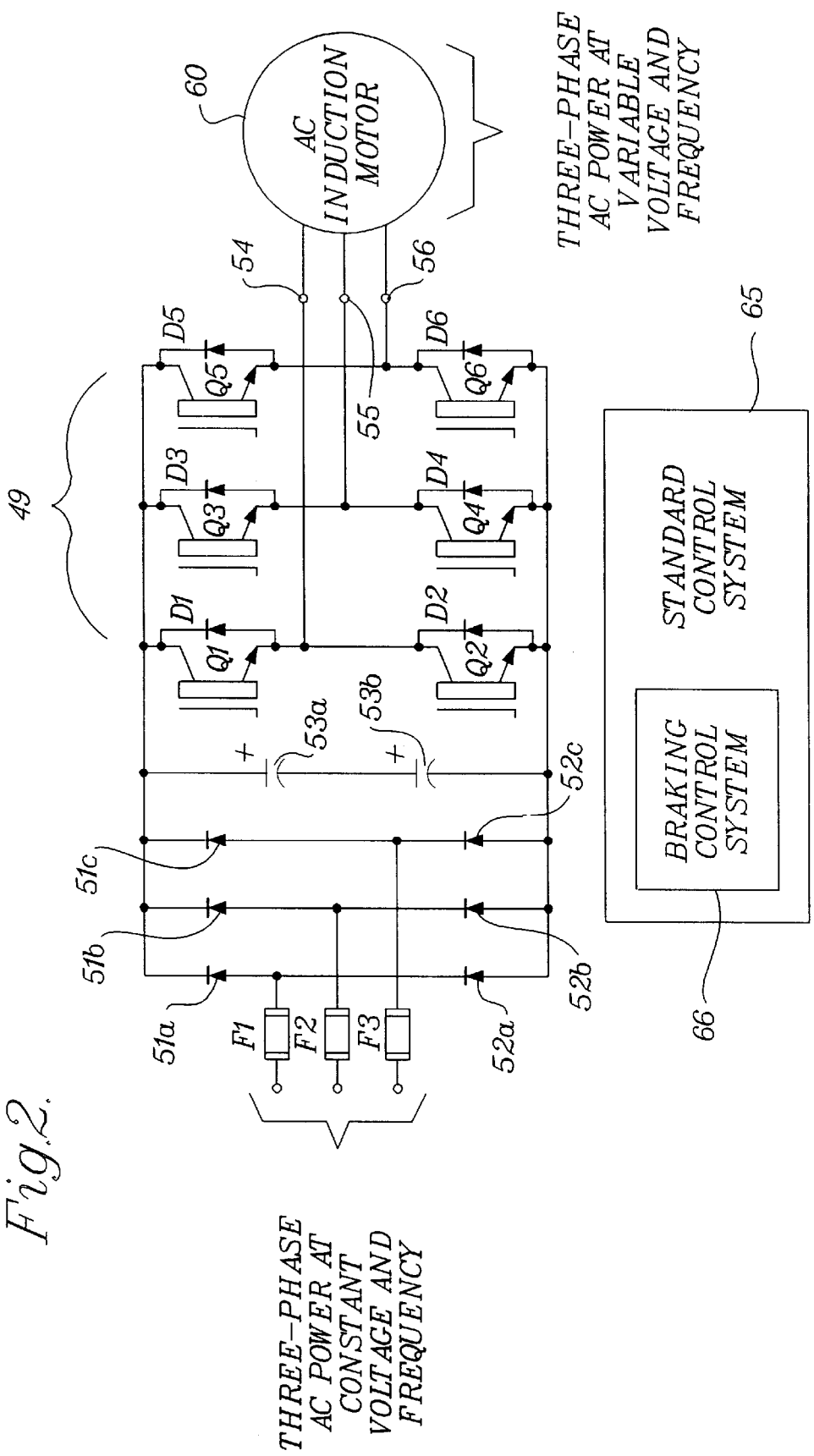
FIG. 2 shows a typical non-modular adjustable frequency AC drive commonly used at lower power levels, but having an electrical braking control.

While the invention will be described as it can be utilized on a specific drive topology, as shown in FIG. 1 or FIG. 2, it is to be understood that the apparatus and method of this invention can be utilized in other AC drive configurations. The drives shown in FIG. 1 and FIG. 2 are non-regenerative and therefore have certain advantageous requirements for utilization of the invention. It is clear that the invention can be utilized on other drive topographies and configurations.

FIG. 1 shows a modular AC drive having an incoming transformer 2. Primary windings 1 excite a number of secondaries 3–11. The output of each secondary winding is fed to a separate power cell 12–20. These power cells are connected in a series arrangement in each leg which in turn feeds a three-phase AC induction motor 21. A central control system 22 sends command signals to local controls 23 in each cell over fiber optics 95. The topography appears similar to that shown in the U.S. Pat. No. 5,625,545 patent, but a braking control system 24 to provide electrical braking as described herein has been added to the standard control 22. The operation of the power circuits in FIG. 1 are described in the U.S. Pat. No. 5,625,545 patent. The input converter in each cell as shown in FIG. 1 has a DC link (diode rectifier bridge) which does not permit energy to flow back into the power line.

FIG. 2 shows a typical non-modular AC drive having a three-phase incoming line which is rectified by the diode bridge 51a–51c, 52a–52c. Capacitors 53a and 53b on the output of the rectifying bridge provide smoothing and store energy so as to provide a source of DC power to an inverter 49. The inverter uses semiconductor switch elements Q1–Q6. Each switch element is shunted by a diode D1–D6. This adjustable frequency control has a three-phase output 54–56. FIG. 2 shows a three-phase output, but other embodiments of the drive could utilize other numbers of phase outputs. As shown the three-phase output of FIG. 2 feeds an induction motor 60. In FIG. 2 a braking control 66 is added to standard controller 65. The input converter shown in FIG. 2 has a DC link (diode rectifier bridge) which does not permit energy to flow back into the power line.

Figure 3:
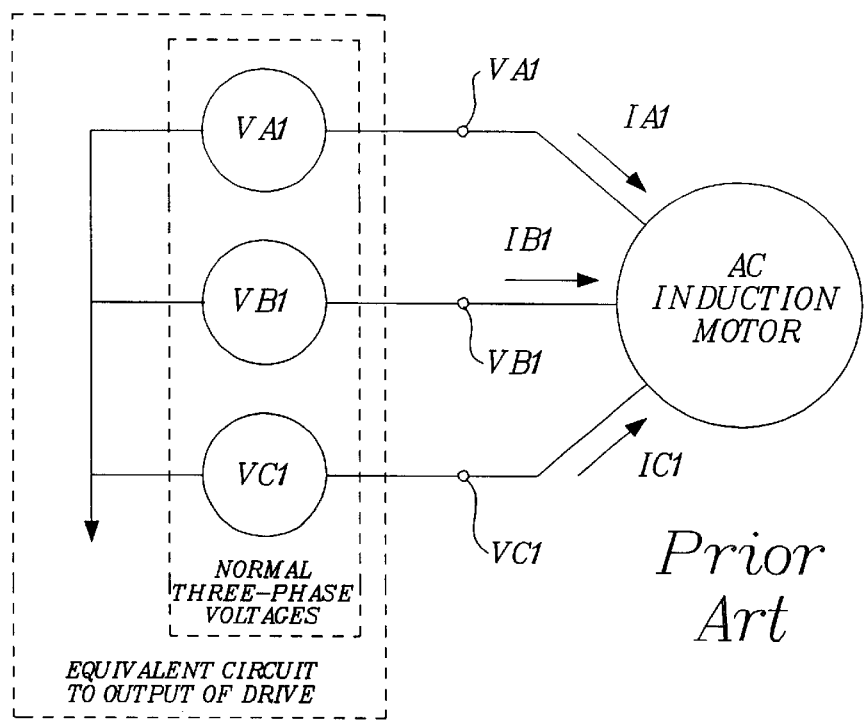
FIG. 3 is a diagram showing a circuit equivalent to the load side of an AC drive producing simple sinusoids.

FIG. 3 shows the equivalent circuit for the load side of an AC drive such as either FIG. 1 or FIG. 2. The effect of the drive on the motor is equivalent to a set of three phase voltage sources VA1, VB1, and VC1. The motor draws three phase currents IA1, IB1, and IC1 in response to these voltages. For normal motor operation, these currents should be balanced three-phase sinusoids. However, either of the power circuits in FIG. 1 or 2 is capable of producing other waveforms.

Figure 4:
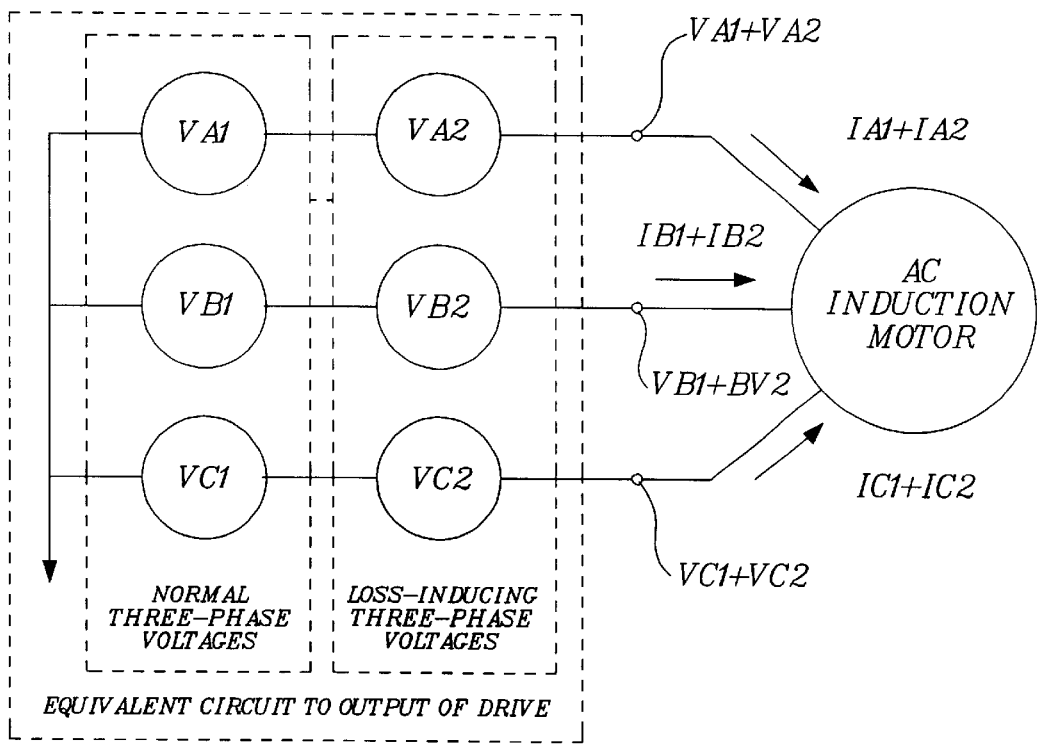
FIG. 4 shows a circuit equivalent to the load side of an AC drive producing two simultaneous sinusoids.

FIG. 4 shows one possible set of alternative waveforms. The drive can apply voltages to the motor that are equivalent to the sum of two separate sinusoids at different frequencies. The effect on the motor is equivalent to having one set of three phase voltage sources VA1, VB1, and VC1 in series with another set of three-phase voltage sources VA2, VB2, and VC2. The peak value of the summed voltages must not exceed the drive voltage capability. The motor will draw currents that are the sum of components due to each of the sources; namely IA1+IA2, IBI1+IB2, and IC1+IC2. The peak value of the summed currents must also not exceed the drive current capability.

This invention uses this ability of the drive to apply two simultaneous voltages to cause the braking energy to be dissipated in the motor itself. Extra losses are induced in the motor by applying a second set of three-phase loss-inducing voltages to the motor, in addition to the normal voltages used for speed control. The energy returned to the DC link, (for example, at capacitors 53a–b in FIG. 2) by the normal voltage set is used to create the second set of loss-inducing voltages, so that the energy is then dissipated in the motor as heat. Many modern drives employ a pulse width modulation (PWM) output in the inverter stage to convert DC to AC. These PWM controls are capable of following complex voltage commands which allow the invention to be utilized without the complexity of adding additional power components. Many drives will be able to utilize the invention with only software modifications. The pulse width modulator is given command waveforms for each phase which are the sum of the desired normal voltage set and the loss-inducing voltage set. The sum of these waveforms must generally not exceed the peak voltage capacity of the output converter.

Figure 5:
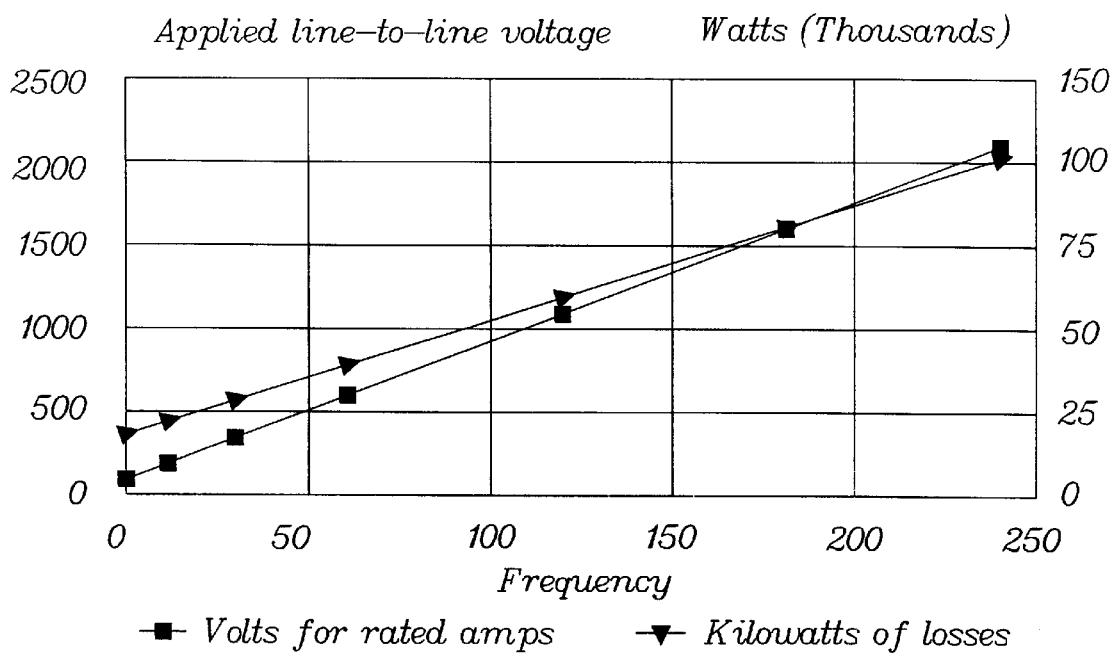
FIG. 5 is a graph showing losses versus frequency of the loss-inducing voltage in a 1000 horsepower AC induction motor.

The second set of loss-inducing voltages should be chosen to minimize the torque pulsations due to interaction of the second set of motor currents with the normal or first set of motor currents, and to minimize the disturbance to the operation of the existing control. In many applications, it will be desirable to choose the second set of loss-inducing voltages to maximize the losses produced in the motor, without exceeding the current capability of the drive. A preferred method of practicing the invention is to utilize a single set of higher frequency balanced three-phase voltages for inducing losses, with the phase sequence being opposite to the direction of rotation. FIG. 5 shows a graph of the effect of such a counter-rotating voltage set on a 1,000 horsepower, 4000 volt, 60 Hz, 4 pole motor spinning forward at 1,800 rpm. These losses represent potential braking of the mechanical load imposed on the motor. The graph represents the steady state behavior of the motor including the high frequency effects, and was derived from an empirical steady-state model for an induction motor, which includes non-linear deep-bar effects. The graph shown in FIG. 5 represents a single counter-rotating voltage set which was simulated at 0.1, 1, 2, 10, 30, 60, 120, 180, and 240 Hz. In each case, the amplitude was adjusted to obtain rated RMS amperes (approximately 127 amps). FIG. 5 shows the voltage amplitude required to achieve rated current, and the losses thus obtained. It is clear that the losses increase consistently as frequency is increased from about 17.5 kilowatts at 1 Hz to over 100 kilowatts at 240 Hz. One hundred kilowatts is more than 13% of rated power. It will allow 13% braking torque at rated speed, or 100% braking torque at 13% speed. The reason for this increase of losses per ampere versus frequency is the skin effect of the rotor conductors. At higher frequency current does not penetrate uniformly through a conductor, and can be considered to concentrate at or near the surface or skin of the conductor. This decreases the effective cross sectional area of the conductor, and therefore increases the apparent resistance of the conductor. The rotor of an induction motor is wound for low voltage and high current, so that the rotor conductors have a larger cross sectional area than the stator conductors. Therefore, the skin effect is much more important in the rotor conductors of an induction motor than in the stator conductors. Higher resistance leads to higher losses (better braking) at the same level of current. By using a counter-rotating set of voltages to induce losses, the frequency of the rotor current is increased even further to the sum of the applied frequency and the effective speed frequency (rpm times the number of poles divided by 120).

In FIG. 5 the voltage required to achieve rated current at 240 Hz is about 2,080 volts. This equates to about 8.7 volts per Hz, as compared to 67 volts per Hz for rated conditions (4,000 volts at 60 Hz). This means that the magnetic flux produced in the motor by the loss-inducing voltage set will be only 13% of rated flux, and will support the goals of minimizing disturbance to the normal control and minimizing torque pulsations. It also means that extra voltage capacity remains in the drive for producing the normal voltages.

The presence of two sets of currents in the motor at two different frequencies will cause an interaction between them, producing torque pulsations. The pulsation frequency is the difference between the two applied frequencies. Since one frequency is positive and the other one is negative, the difference will be equal to the sum of the absolute values. For example, with 60 Hz forward sequence (normal) and 240 Hz reverse sequence (loss-inducing), the pulsation frequency will be 300 Hz. As the speed of the motor slows down due to the braking, the pulsation frequency will also reduce if the loss-inducing frequency remains constant while the normal frequency decreases. A high pulsation frequency will tend to reduce the probability of exciting a torsional resonance in the driven load, although such mechanical resonance may not be a problem under some configurations. However, to limit resonance, it is preferred that the negative loss-inducing frequency should increase as the speed (and the normal frequency) decreases, thereby maintaining a constant pulsation frequency. In embodiments utilizing a generally fixed pulsation frequency, it may be desirable that individual drives have the ability to adjust the constant pulsation frequency (over a narrow range), so as to permit adjustment of the specific drive so that any torsional resonance can be avoided by tuning the drive to a non-resonant frequency.

Figure 7:
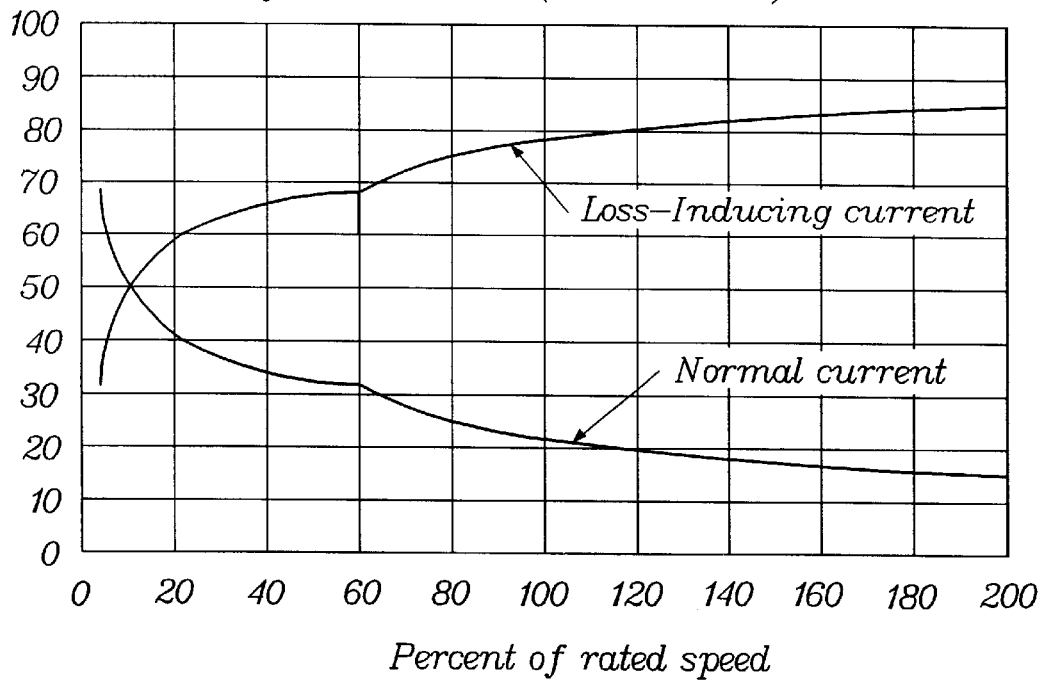
FIG. 7 shows the normal and loss-inducing currents versus speed resulting from the voltage allocation of FIG. 6.
Figure 8:
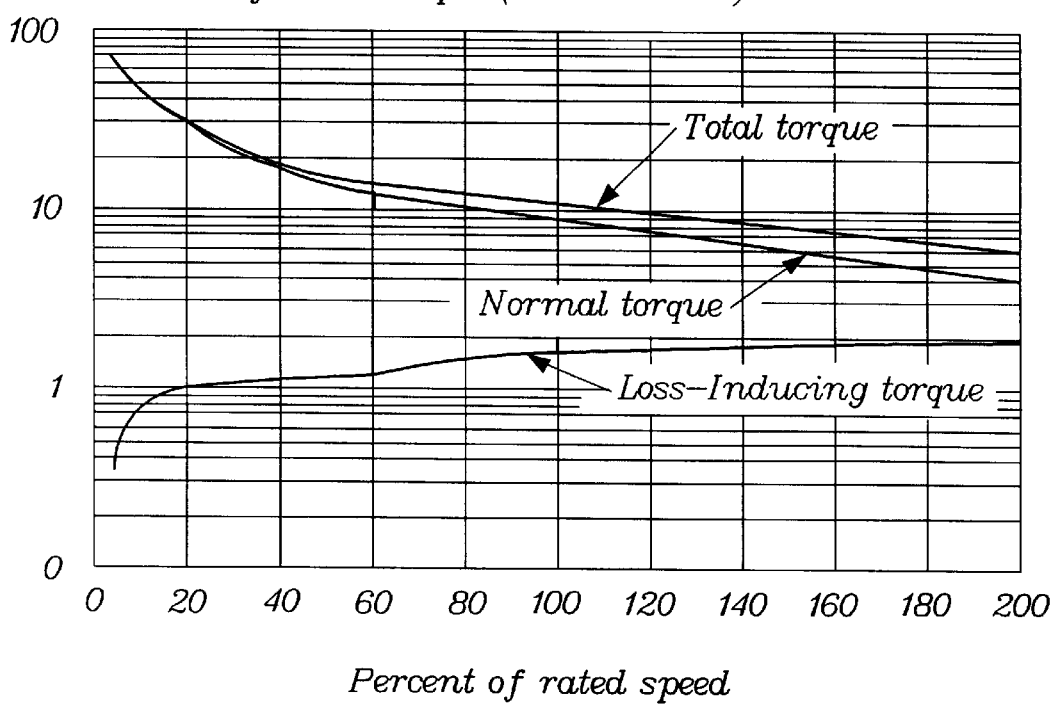
FIG. 8 shows the normal, loss-inducing, and total torques versus speed resulting from the voltage allocation of FIG. 6.

The data in FIG. 5 is optimistic because it assumes full rated current can be devoted to inducing losses. In practice, some of the drive current capability must be assigned to the normal current. The performance limitations of the method of this invention were therefore investigated by means of the same steady-state induction motor model as was used for FIG. 5. The model parameters used represent the same motor as in FIG. 5, rated at 1000 HP, 4000 volt, 60 Hertz, and 1780 RPM. The torque pulsation frequency was set at 300 Hertz. The loss-inducing frequency was therefore equal to the pulsation frequency minus the normal frequency; for example 300 Hertz at standstill, 240 Hertz at rated speed, and 180 Hertz at twice rated speed. For each speed, the amplitudes of the normal and the loss-inducing voltages were adjusted for maximum braking torque, while matching the induced losses to the absorbed braking power, and while preventing the total voltage and total current from exceeding 100% of rating (4000 volts, 127 amps). The results of this limitation study are shown in FIGS. 6, 7, and 8 for a maximum total current of 100% of rated.

Figure 6:
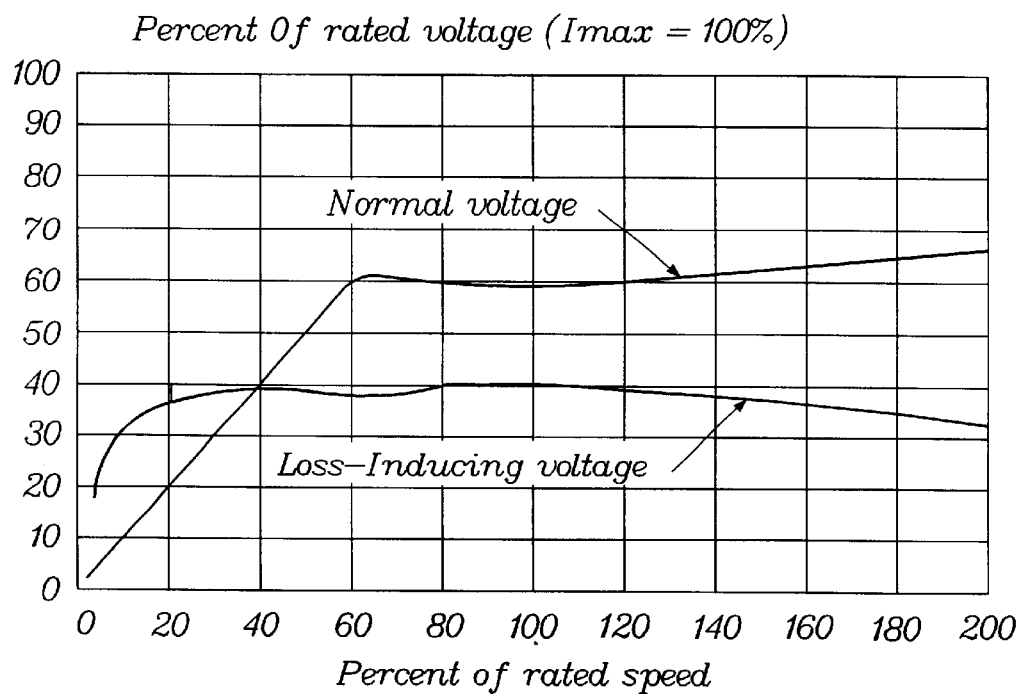
FIG. 6 shows the allocation of the normal and loss-inducing voltages versus speed giving optimum braking performance.

FIG. 6 shows the two voltage amplitudes versus speed. For any speed above 60% of rated, it is clear that the total voltage is always 100%. Below 60% of rated speed, the normal voltage follows the speed to maintain the rated ratio of volts per Hertz. FIG. 7 shows the two currents resulting from the voltage of FIG. 6 versus speed. For all speeds, it is clear that the total current is always 100%. At high speed most of the available current is allocated to the loss-inducing frequency, since even a small braking torque requires large losses. As the speed decreases, the loss-inducing current is progressively reduced and the normal current is increased. Once rated flux is achieved in the motor, the process continues but at a different rate. FIG. 8 shows the two torques, plus the total torque, versus speed. At all speeds most of the torque is produced by the normal frequency, although the torque from the loss-inducing frequency becomes significant at high speed. The total braking torque available is about 6% at 200% speed, 11% at 100% speed, and 30% at 20% speed.

The motor impedance at the loss-inducing frequency is dominated by the leakage reactance. At high speed the loss-inducing frequency and hence the impedance is reduced, decreasing the voltage needed to force the large loss-inducing current. As the speed decreases the loss-inducing frequency increases, but the current required diminishes. These effects tend to cancel and produce a nearly constant loss-inducing voltage over most of the speed range.

Figure 9:
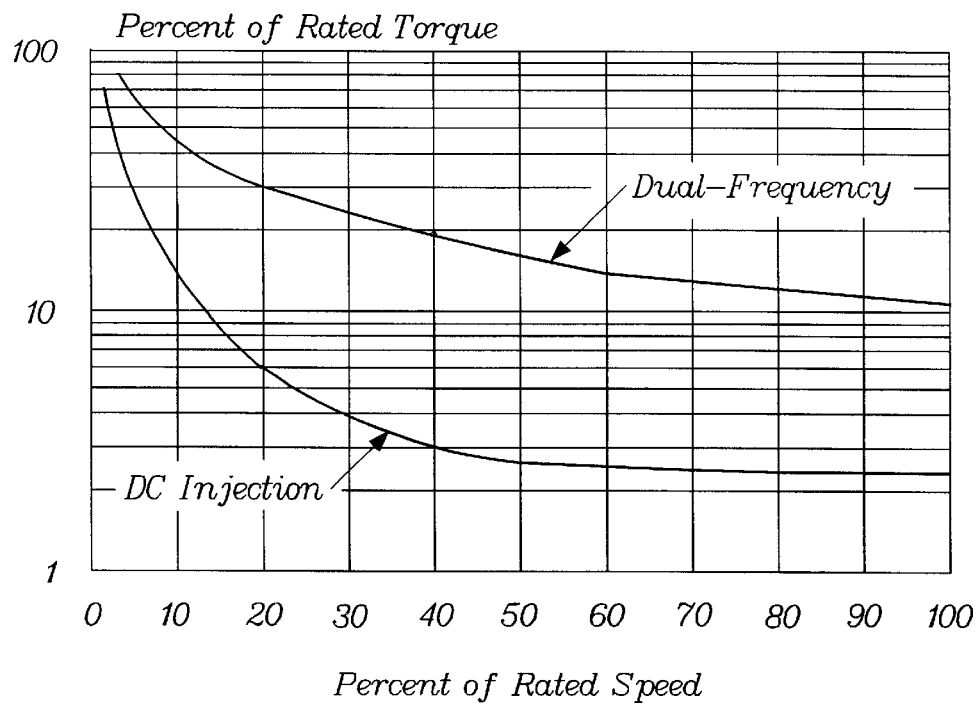
FIG. 9 compares the braking torque available with this invention versus DC injection.

The same model can also be used to predict the braking torque produced by applying a DC current to the motor. FIG. 9 compares the torque from DC injection versus dual-frequency AC injection according to this invention, when both methods are limited to a peak current of 100% of rated. Throughout most of the speed range, the braking torque from dual-frequency AC injection is four to five times the value from DC injection.

Figure 10:
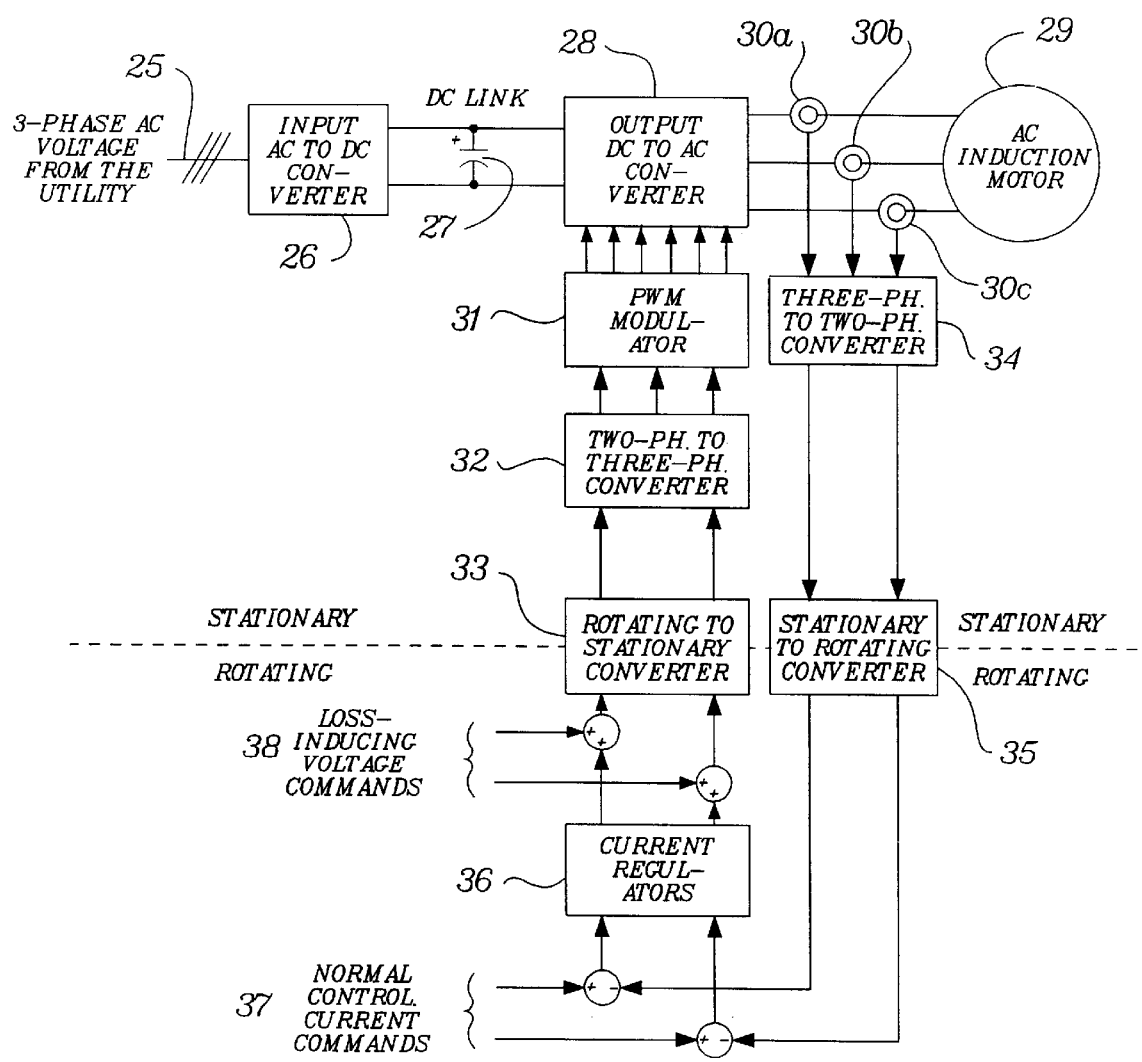
FIG. 10 is a diagrammatic representation of a preferred control embodiment utilizing the electrical braking scheme of this invention.

FIG. 10 shows a preferred embodiment to add the loss-inducing commands to the drive control. It could be utilized on a drive such as that shown in FIG. 1 or 2. The invention can be implemented in either hardware or software, but most modern designs will use software to produce the command signals. In addition, most drives also contain a current regulator or other equipment which provides the function to control the voltage applied to the motor in such a way as to force the motor currents to follow a set of current commands. FIG. 10 shows a three-phase AC incoming line 25, which feeds into an AC to DC converter 26. Smoothing and energy storage is obtained through the utilization of a capacitor or capacitors 27. The converter also includes an output portion, which is an inverter to convert DC to AC, 28. The controllable AC current is fed to induction motor 29. Current sensors 30a, 30b, 30c feed a three-phase to two-phase converter 34 which in turn has an output which is two-phase. This output is fed to a stationary-to-rotating converter 35. In normal operation a first set or normal set of control current commands 37 are compared to the motor current signal from 35, and the errors are fed to a current regulator 36. In FIG. 10 the second set or loss-inducing set of voltage commands 38 are added to the output of the current regulator 36. The combined voltage commands are then fed to a rotating-to-stationary converter 33 and then converted from two-phase to three-phase signals by converter 32. The three-phase signals feed a PWM control 31 which is operated in a well known manner to control switches such as Q1–Q6 in FIG. 2.

The current regulator 36 is usually configured, as shown, to operate on two-phase quantities in a coordinate system rotating at the speed of the motor variables. This method is called vector control, and it allows the current to be separated into torque-producing and flux-producing components. It also allows the current regulator to deal with zero-frequency variables, permitting good accuracy with reasonable gains. The embodiment shown in FIG. 10 adds the loss-inducing commands to the voltage command output of the current regulators 36. This is done just before the signals are transformed back to stationary coordinates and converted into a three-phase form. This embodiment avoids requiring the current regulators to respond to the higher frequency of the loss-inducing commands. This embodiment also allows the loss-inducing commands to be applied at the fixed frequency selected for the torque pulsations, because the rotating-to-stationary conversion will automatically add the effective speed frequency to the loss-inducing frequency. When this effective speed frequency is then subtracted inside the motor as previously described, the result will be a generally fixed pulsation frequency at the selected value. The control may be located, for example, in the master controller 22 or 65.

FIG. 10 does not show several higher level control functions which can be present. There will generally be a detector to indicate when the loss-inducing commands are required. This loss-inducing command control will adjust the amplitude of the loss-inducing commands as required by the specific braking application. There will also be included circuitry or software to limit the normal commands so that the peak total voltage or current applied to the motor does not exceed the capacities of the power converters. Additional control functions can be easily achieved in software-based systems by adding additional coding to provide these functions. In other non-software-based systems, known control elements can be utilized as hardware to perform these desirable operations.

Figure 11:
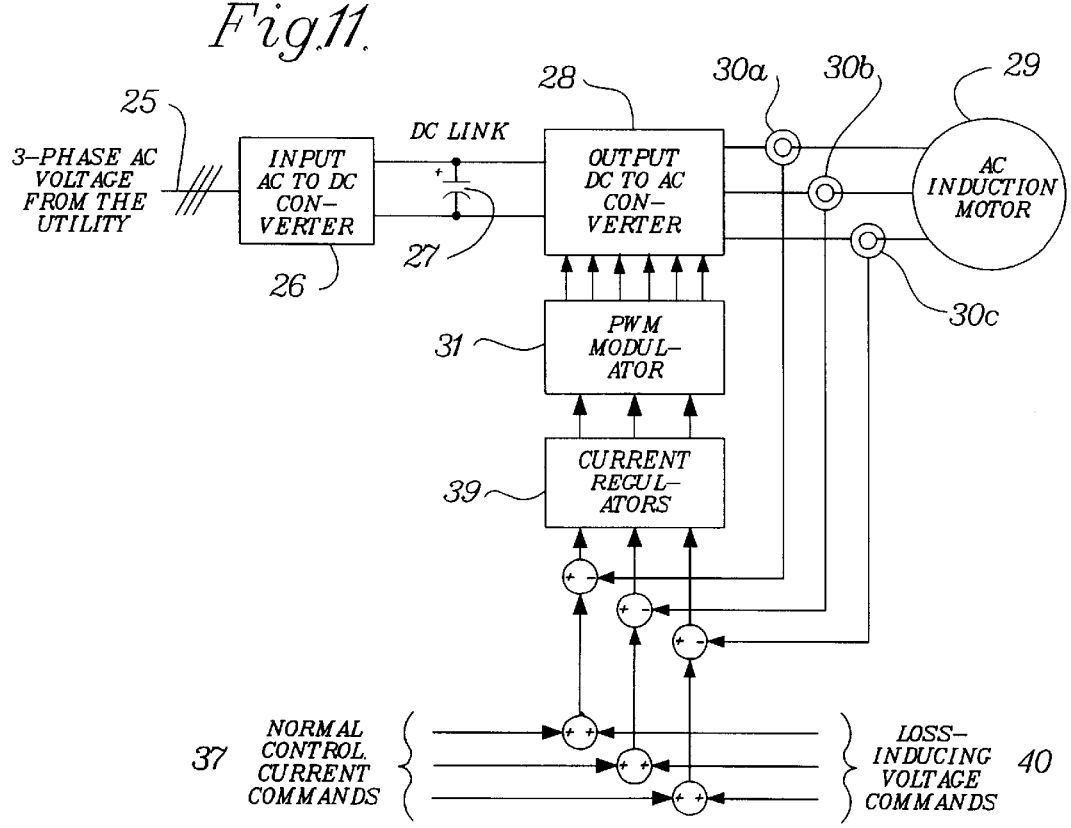
FIG. 11 is a diagrammatic representation of one alternate control embodiment utilizing the electrical braking scheme of this invention.

FIG. 11 shows how the loss-inducing commands might be added to a different control configuration. The control configuration of FIG. 11 does not employ the transformations from three-phase to two-phase nor from stationary to rotating coordinates.

The configuration of FIG. 11 utilizes the current regulators 39 to operate on three-phase AC quantities. Therefore, the loss-inducing current commands 40 are simply added directly to the normal set of three-phase current commands 37. As has previously been discussed, higher level control functions, such as pulsation control, the control of the loss-inducing commands, the amplitude adjustment of the motor signal, and the peak voltage functions have been omitted from the block diagram shown in FIG. 11 for clarity.

Figure 12:
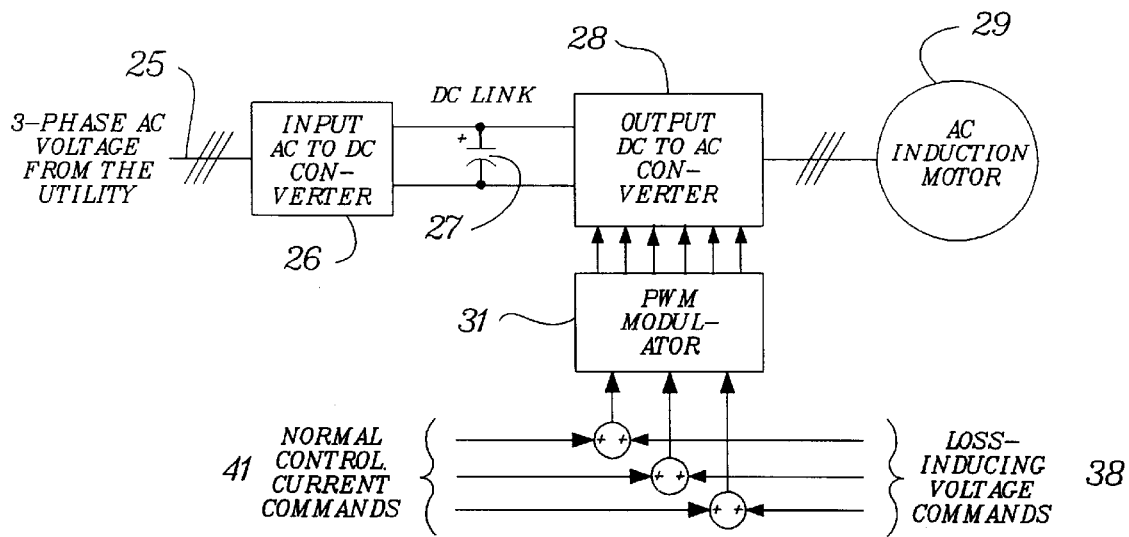
FIG. 12 shows another embodiment of a second alternate control embodiment utilizing the electrical braking scheme of this invention.

FIG. 12 shows an embodiment in which the loss-inducing commands can be added to a third control configuration. This control configuration does not employ current regulators nor the transformation from three-phase to two-phase nor the transformation from stationary to rotating coordinates. In this configuration, the voltage on the motor 29 is controlled instead of the current, in an open loop manner. The loss-inducing voltage command set 38 is simply added directly to the normal set of voltage commands 41, and the sum is fed to PWM control 31. The same higher level control functions which have previously been described would also be included in embodiments of FIG. 12.

Figure 13:
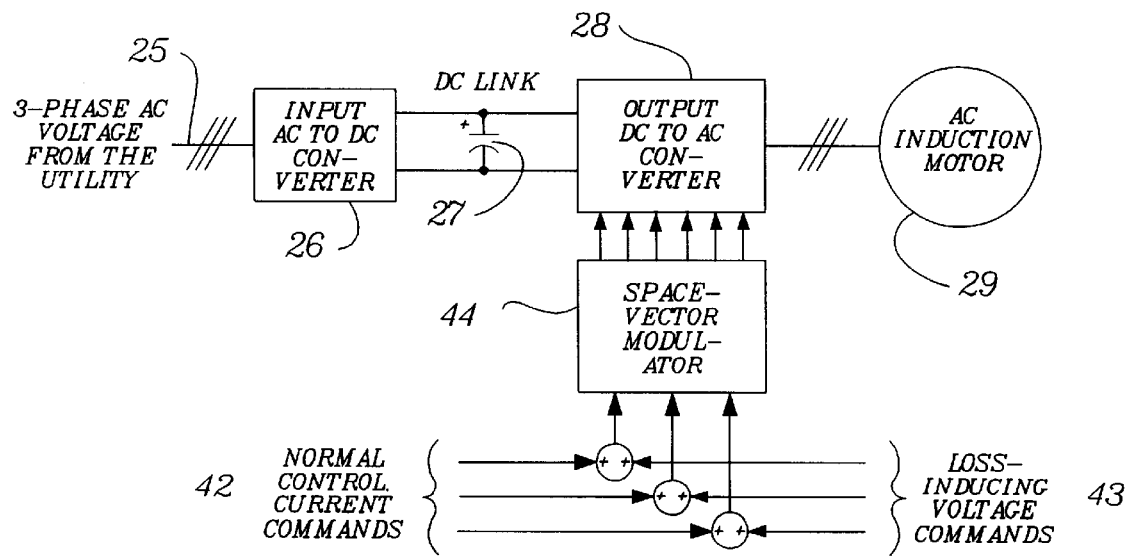
FIG. 13 shows another embodiment of a third alternate control embodiment utilizing the electrical braking scheme of this invention with space vector modulation.

FIG. 13 shows another embodiment in utilizing the loss-inducing commands. In this control configuration, a Space-Vector method is utilized. In the configuration of FIG. 13 the volt-seconds on the motor are controlled. The loss-inducing volt-second commands 43 are simply added directly to the normal set of volt-second commands 42. The sums of the two sets of commands are then fed to the vector modulator 44 which controls the output of the DC to AC converter section 28. Functions that were previously described with regard to the higher level controls can also be added to the configuration of FIG. 13.

Figure 16:
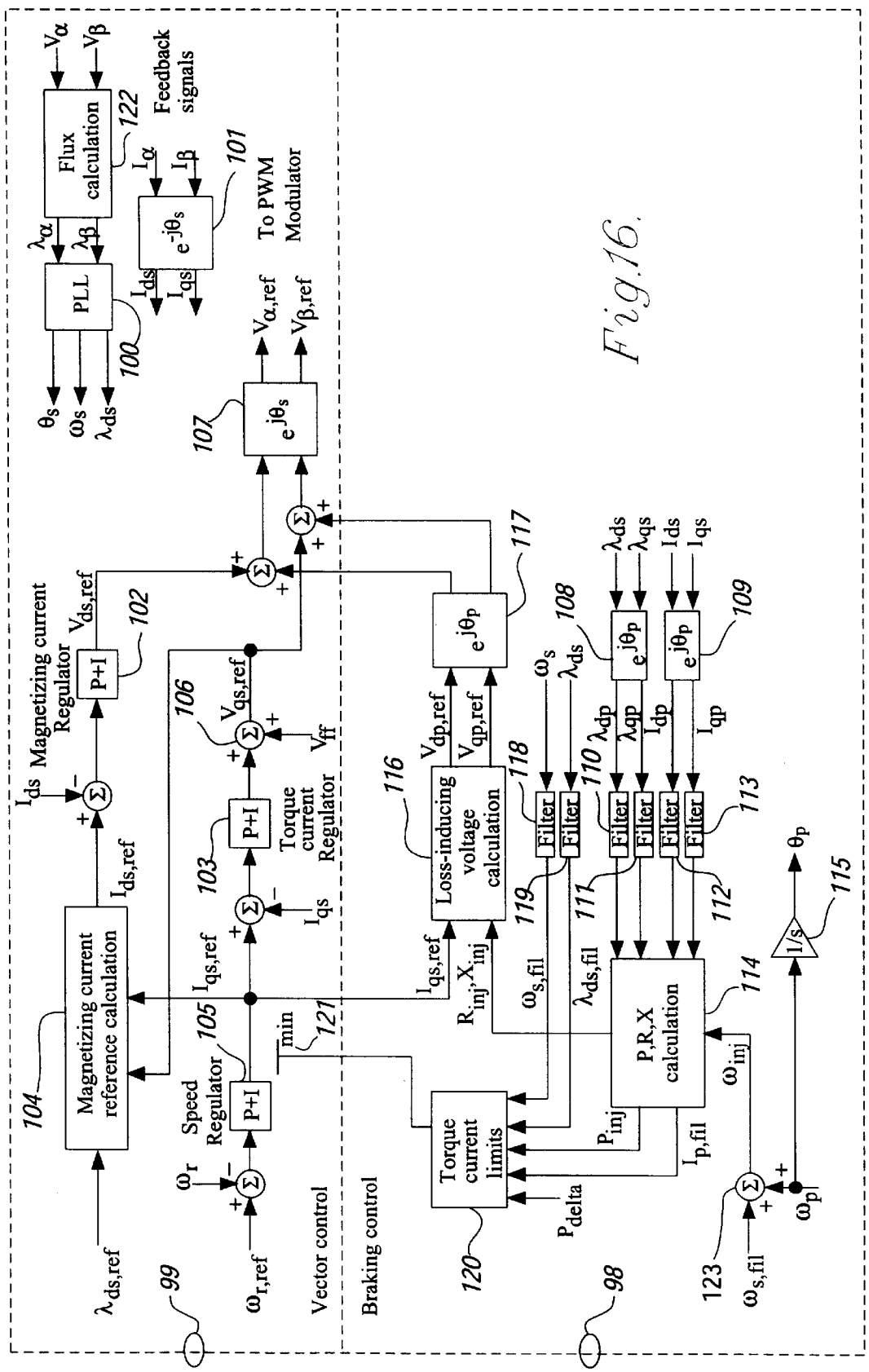
FIG. 16 shows a diagram of an embodiment of one type of control scheme.

The control diagram in FIG. 16 shows a preferred embodiment of the braking control (block 98), similar to FIG. 10, but in greater detail including higher level functions and the control for normal motor operation (block 99). The feedback signals consist of motor voltages and motor currents in the stationary reference frame. The measured feedback signals have been converted from three phase quantities to two phase quantities (designated with subscripts α and β in FIG. 16) by means shown in FIG. 10. The motor volt-seconds are derived from the motor voltages and currents (block 122) according to the equations:

$$\lambda_\alpha = \int (V_\alpha - R_s I_\alpha) dt$$

$$\lambda_\beta = \int (V_\beta - R_s I_\beta) dt$$

where, $R_s$ is the stator resistance of the motor. The motor volt-seconds are also referred to as stator flux. A phase-locked-loop or PLL (block 100) is used to estimate the magnitude, $\lambda_{ds}$, frequency $\omega_s$, and angle, $\theta_s$, of the stator flux. This is described in various publications [R1]. The motor current signals in the stationary reference frame are converted to a reference frame (block 101) that is synchronously rotating with the stator flux. This transformation is described by the following equations:

$$\begin{bmatrix} I_{ds} \\ I_{qs} \end{bmatrix} = [e^{-j\theta_s}] \begin{bmatrix} I_\alpha \\ I_\beta \end{bmatrix} \Rightarrow \begin{array}{l} I_{ds} = I_\alpha \cos\theta_s + I_\beta \sin\theta_s \\ I_{qs} = -I_\alpha \sin\theta_s + I_\beta \cos\theta_s \end{array}$$

Outputs of block 101 represent the motor magnetizing current $I_{ds}$ and the motor torque current $I_{qs}$. These current components are independently controlled through regulators 102 and 103. The input to regulator 102 consists of the difference between the command $I_{ds,ref}$ and the measured value of magnetizing current. The magnetizing current command is calculated (in block 104) from the desired stator flux in an open-loop fashion or can be determined with a regulator that controls the measured stator flux to a desired level. Regulator 103 operates on the difference between the commanded ($I_{qs,ref}$) and measured ($I_{qs}$) torque current components. The torque current command is generated by a speed regulator (block 105), which compares a set speed command $\omega_{r,ref}$ with the estimated speed $\omega_r$. A simple method of estimating stator speed, by means not shown in FIG. 16, can be described as $$\omega_r = \omega_s - \omega_{slip}, \omega_{slip} = k_t I_{qs}$$

where, $\omega_{slip}$ is the slip speed of the motor and $k_t$ is a constant. Other methods to estimate motor speed have been published where $k_t$ is not a constant but a variable that is modified depending on operating conditions [R2].

In a medium performance motor drive, the outputs of the current regulators (blocks 102 and 103) form the voltage commands in the synchronously rotating frame. These are transformed to the stationary reference using a reverse transformation (block 107) as stated below.

$$\begin{bmatrix} V_{\alpha,ref} \\ V_{\beta,ref} \end{bmatrix} = [e^{+j\theta_s}] \begin{bmatrix} V_{ds,ref} \\ V_{qs,ref} \end{bmatrix} \Rightarrow \begin{array}{l} V_{\alpha,ref} = V_{ds,ref}\cos\theta_s - V_{qs,ref}\sin\theta_s \\ V_{\beta,ref} = +V_{ds,ref}\sin\theta_s + V_{qs,ref}\cos\theta_s \end{array}$$

For high performance drives, feed-forward terms may be added to the outputs of the current regulators to improve the transient performance of the drive. In FIG. 16, a feed-forward term is shown only at the output of the torque current regulator ($V_{ff}$) and is summed with the output of the torque current regulator using block 106.

The control (block 98) for dynamic braking uses the same feedback signals as in normal control but processes these signals further to extract information about the motor at the loss-inducing frequency. During dual-frequency braking, the measured signals contain two frequencies of interest, namely, the normal operating frequency $\omega_s$ and the loss-inducing frequency $\omega_{inj}$. Transformation of these feedback signals to the synchronously rotating (stator flux) flux frame shifts the normal frequencies to dc and the loss-inducing frequency to the pulsating frequency, $\omega_p(=\omega_s-\omega_{inj})$. This means that during braking, signals $\lambda_{ds}$, $\omega_s$, $I_{ds}$ and $I_{qs}$ contain a dc component that corresponds to the normal operating frequency and a component at the pulsating frequency that corresponds to the loss-inducing frequency. A further rotation by the pulsating frequency angle $\theta_p$ transforms the pulsating frequency components to dc quantities. This is done using blocks 108 and 109 which are similar to 101. The pulsating frequency angle $\theta_p$ is determined from the pulsating frequency $\omega_p$ using a simple integrator 115. Note that $\omega_p$ is a number that has been selected by the user.

One of the inputs to block 108, $\lambda_{qs}$ is essentially zero because the PLL (block 100) aligns the stator flux entirely along the d-axis. Filters 110 through 113 remove the ac quantities in the inputs resulting in outputs that represent loss-inducing frequency components (designated with the sub-script fil). On the other hand, filters 118 and 119 remove the loss-inducing frequency (ac) components and present outputs that represent the normal operating frequency components. These filters may be low pass filters or synchronous filters that average data over one cycle of the pulsating frequency.

The loss-inducing frequency $\omega_{inj}$ is calculated using the summation block 123 with the inputs being the filtered value of normal operating frequency and the pulsating frequency $\omega_p$. The power dissipated in the motor at the loss-inducing frequency $P_{inj}$ and the motor equivalent resistance $R_{inj}$ and reactance $X_{inj}$ at that frequency are calculated using the average values of the flux and current, and the loss-inducing frequency (block 114). Based on the power being absorbed at the normal operating frequency and the motor equivalent circuit at the loss-inducing frequency, the loss-inducing voltage commands ($V_{dp,ref}$ and $V_{qp,ref}$) are calculated (block 116). Without loss of generality (and for ease of computation), the q-axis component, $V_{qp,ref}$ can be made zero, and all of the calculated loss-inducing voltage can be assigned to the d-axis component. The loss-inducing voltage command is limited (in block 116) to be no more than a preset value such as 50% of the rated inverter voltage. These commands are transformed to the synchronously rotating (stator flux) reference frame as shown in block 117 and summed with the operating frequency commands, similar to FIG. 10, to form the voltage commands. These are then further transformed in block 107 to the stationary reference frame, and sent to the PWM modulator.

The power dissipated in the motor is used in block 120 to establish a first minimum braking current limit command 121 applied at the output of the speed regulator (block 105). When braking is initiated and the magnitude of the loss-inducing voltage is small, the first limit is calculated by using a value for $P_{inj}$ that is higher than its calculated value by $P_{delta}$. This allows the control to begin injection and attain maximum braking that is needed. A second braking current limit is derived from the inverter current capacity available for torque current. This second limit is determined from the inverter rated current and the current estimated at the loss-inducing frequency. The minimum torque current limit (121) which results in lowest inverter current is chosen from among these two limits.

When braking is required at higher speeds, the motor flux may have to be reduced in order to make room for the loss-inducing voltage. This is done by reducing the magnetizing current to a suitable value that is a function of operating speed prior to braking. Once this is completed, the current regulator gains in blocks 102 and 103 are reduced to make the regulators immune to the ac components in the feedback signals. As speed decreases, there is increasing room for the normal operating voltages and hence the magnetizing current command is increased to utilize the converter optimally (block 104).

Figure 14:
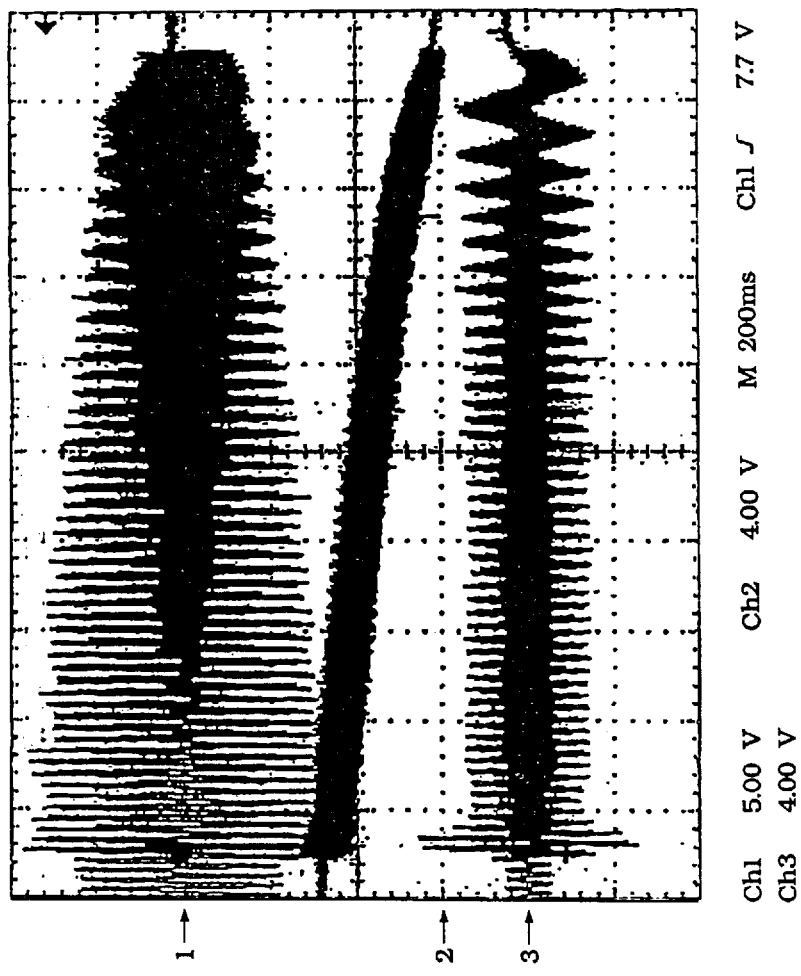
FIG. 14 is an experimental plot of command signals, motor speed, and current.

FIG. 14 shows motor variables during experimental testing of multiple frequency braking operation. The drive and motor were rated 10 HP at 460 volts, 60 Hz. The control structure followed FIG. 10. The graph includes a first channel which shows voltage command to the modulator. The second channel shows the motor speed estimation. The third channel shows motor current. The motor as depicted in FIG. 14 was operating unloaded at 45 Hz when braking was initiated. This figure shows the entire deceleration from approximately 1350 rpm (four-pole motor at 45 Hz) to standstill. The motor was coupled to a generally equal sized DC machine, so that the total inertia was at least 200% of the motor's inertia. The deceleration, Channel 2, begins about ½ division (100 milliseconds) from the left edge of the plot and occupies nine divisions representing 1.8 seconds.

Figure 15:
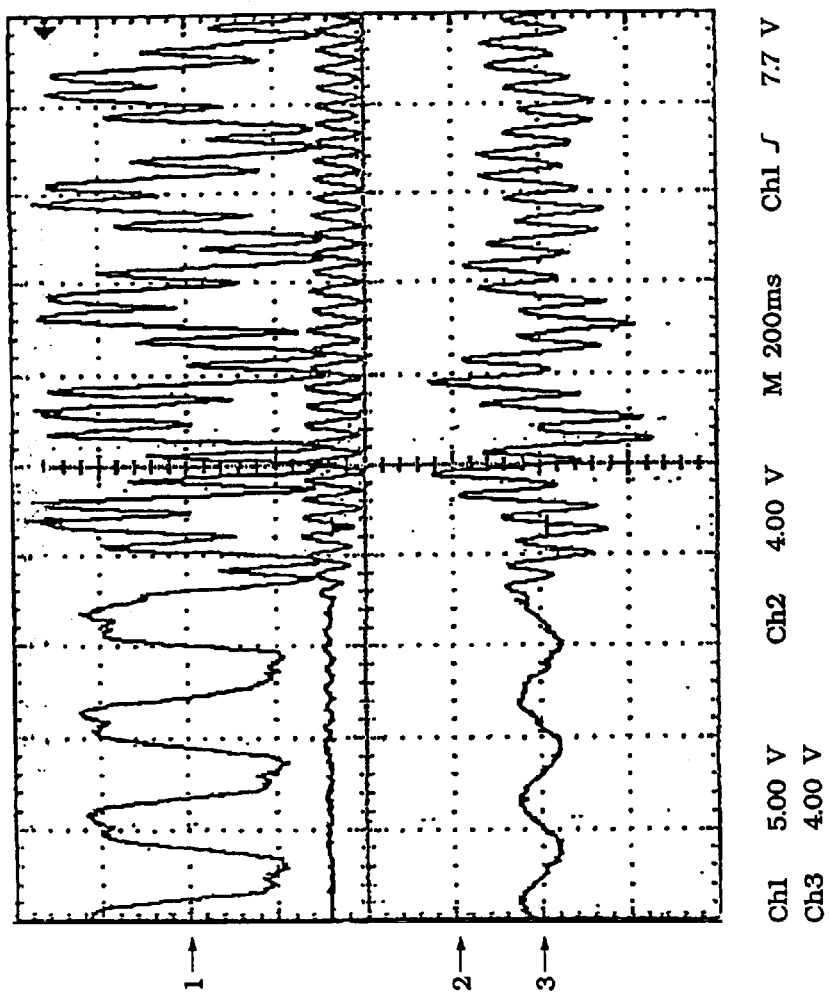
FIG. 15 shows an expanded plot of the signals in FIG. 14.

FIG. 15 shows the first two hundred milliseconds of the same event, expanded to fill the entire plot. The diagram in FIG. 15 shows that even before braking, the normal voltage command (Channel 1) is not sinusoidal because it contains a zero sequence (common mode) component from the peak reduction function. The motor does not respond to the zero sequence component due to the three-wire connection, so that the motor current is sinusoidal prior to braking (Channel 3). At the moment the braking begins, the loss-inducing voltage (approximately 150 volts at 240 Hz) is superimposed on the normal voltage (approximately 345 volts at 45 Hz). This is shown on Channel 1 of FIG. 15. This superimposition causes the motor current to also show both frequencies on Channel 3. The motor speed estimate on Channel 2 is derived from the motor voltage. When the loss-inducing voltage is superimposed on the normal drive voltage it disturbs the speed estimate, causing ripple at approximately 240 Hz to appear. However, the average value of the speed estimate is still correct in this type of arrangement.

As has previously been described, the invention includes a method in which a second set of voltage values are imposed onto an operating motor in addition to the normal voltages, to produce effective braking torque in which the energy is dissipated within the motor itself. The invention has been described in connection with certain embodiments and given topographies. It is to be understood that this invention may be practiced using other drive topographies, which utilize the multiple frequency braking motor control. Certain embodiments have been shown with the understanding that those skilled in the art will readily recognize that the invention may be utilized in other drive topographies or with other control structures besides those shown herein. It is to be further understood that the current and voltage limitations described were examples, and that the drive capabilities need not be equal to the motor ratings in order to employ this method.

What is claimed is:

1. A drive braking control to produce counter-rotating torque in an AC motor, comprising:
    a converter supplying multiple frequency AC power to said motor;
    said control providing a normal frequency output to said motor at a first frequency;
    said control simultaneously providing a second loss-inducing frequency output to said motor to produce a level of desired braking to the motor speed; and
    said second frequency being different than said first frequency.

2. The control of claim 1 wherein the second frequency is higher than said first frequency.

3. The control of claim 2 wherein said second frequency is counter rotating from said first frequency.

4. The control of claim 3 wherein the amplitudes of voltages of both the first and second frequency are controlled to maximize the counter-rotating torque, while matching induced losses to absorbed energy.

5. The control of claim 3 wherein said difference between said first frequency and said second frequency is controlled at a previously determined value.

6. The control of claim 3 wherein the combined output voltages and currents from said first and second frequencies are maintained below preset limits.

7. The control of claim 3 wherein the amplitude at the second frequency is controlled to generally consume energy absorbed during braking.

8. The control of claim 3 wherein continuous estimation of motor speed is maintained during braking to permit a prompt return to positive torque production.

9. The control of claim 3 wherein the loss-inducing commands are introduced in a rotating coordinate system, using a desired torque-pulsation frequency generally corresponding to a given torque-pulsation, so that the loss-inducing frequency actually applied to the motor automatically varies with the speed of the motor to maintain the difference between the normal and loss-inducing frequencies equal to the desired torque-pulsation frequency.

10. The control of claim 1 wherein said difference between said first frequency and said second frequency is controlled at a previously determined value.

11. The control of claim 10 wherein the amplitudes of the voltages of both the first and second frequencies are controlled to maximize the counter-rotating torque, while matching induced losses to absorbed energy, and while generally not exceeding the current and voltage capabilities of said converter.

12. The control of claim 10 wherein combined output voltages and currents from said first and second frequencies are maintained below preset limits.

13. The control of claim 12 wherein the amplitude at the second frequency is controlled to generally consume the energy absorbed during braking.

14. The control of claim 1 wherein combined output voltages and currents from said first and second frequencies are maintained below preset limits.

15. The control of claim 1 wherein the amplitude of said second frequency is controlled to generally consume the energy absorbed during braking.

16. The control of claim 15 wherein continuous estimation of motor speed is maintained during braking to permit a prompt return to positive torque production.

17. The control of claim 16 wherein the amplitudes of the voltages of both the first and second frequencies are controlled to maximize the counter-rotating torque, while generally matching induced losses to absorbed energy, and while generally not exceeding the current and voltage capabilities of said converter.

18. The control of claim 16 wherein the loss-inducing commands are introduced in a rotating coordinate system, using a desired torque-pulsation frequency generally corresponding to a given torque-pulsation, so that the loss-inducing frequency actually applied to the motor automatically varies with the speed of the motor to generally maintain the difference between the normal and loss-inducing frequencies generally equal to the desired torque-pulsation frequency.

19. The control of claim 1 wherein two or more loss-inducing frequencies are simultaneously employed.

20. The control of claim 1 wherein continuous estimation of motor speed is maintained during braking to permit a prompt return to positive torque production.

21. The control of claim 1 wherein loss-inducing commands are introduced in a rotating coordinate system, using a desired torque-pulsation frequency generally corresponding to a given torque-pulsation, so that the loss-inducing frequency actually applied to the motor automatically varies with the speed of the motor to maintain the difference between the normal and loss-inducing frequencies generally equal to the desired torque-pulsation frequency.

22. A method of braking to produce counter-rotating torque in an AC motor, comprising:

providing a normal frequency output to said motor at a first frequency;

simultaneously providing a second loss-inducing frequency output to said motor to produce braking torque to the motor; and said second frequency being provided at a frequency different than said first frequency.

23. The method of claim 22 wherein the second frequency is higher than said first frequency.

24. The method of claim 23 wherein said second frequency is provided rotating counter from said first frequency.

25. The method of claim 24 further comprising controlling the difference between said first frequency and said second frequency at a previously determined value.

26. The method of claim 24 wherein the combined output voltages and currents from said first and second frequencies are maintained below preset limits.

27. The method of claim 24 further comprising controlling the amplitude of the second frequency to generally consume energy absorbed during braking.

28. The method of claim 24 further comprising continuous estimation of motor speed during braking to permit a prompt return to positive torque production.

29. The method of claim 28 further comprising:

providing a converter to supply said normal and said loss-inducing frequencies; and providing a controller to control the amplitudes of voltages of said normal and said loss-inducing frequencies to maximize the counter-rotating torque, while generally matching induced losses to absorbed energy, and while generally not exceeding current and voltage capabilities of said converter.

30. The method of claim 24 further comprising introducing the loss-inducing commands in a rotating coordinate system, using a desired torque-pulsation frequency generally corresponding to a given torque-pulsation, so that the loss-inducing frequency actually applied to the motor automatically varies with the speed of the motor to maintain the difference between the normal and loss-inducing frequencies equal to the desired torque-pulsation frequency.

31. The method of claim 22 further comprising controlling the difference between said first frequency and said second frequency at a previously determined value.

32. The method of claim 31 further comprising:

providing a converter to supply said normal and said loss-inducing frequencies; and providing a controller to control the amplitudes of the voltages of said normal and said loss-inducing frequencies to maximize the counter-rotating torque, while matching induced losses to absorbed energy at a value to generally not exceed current and voltage capabilities of said converter.

33. The method of claim 31 wherein further comprising maintaining combined output voltages and currents from said first and second frequencies below preset limits.

34. The method of claim 33 further comprising controlling amplitude of the second frequency to generally consume the energy absorbed during braking.

35. The method of claim 22 further comprising maintaining combined output voltages and currents from said first and second frequencies below preset limits.

36. The method of claim 22 further comprising controlling the amplitude of the second frequency to generally consume the energy absorbed during braking.

37. The method of claim 36 further comprising maintaining continuous estimation of motor speed during braking to permit a prompt return to positive torque production.

38. The method of claim 37 further comprising:

providing a converter to supply said normal and said loss-inducing frequencies; and providing a controller to control the amplitudes of voltages of said normal and said loss-inducing frequencies to maximize the counter-rotating torque, while generally matching induced losses to absorbed energy, and while generally not exceeding the current and voltage capabilities of said converter.

39. The method of claim 37 further comprising introducing the loss-inducing commands in a rotating coordinate system, using a desired torque-pulsation frequency generally corresponding to a given torque-pulsation, so that the loss-inducing frequency actually applied to the motor automatically varies with the speed of the motor to generally maintain the difference between the normal and loss-inducing frequencies generally equal to the desired torque-pulsation frequency.

40. The method of claim 22 further comprising employing two or more loss-inducing frequencies simultaneously.

41. The method of claim 22 further comprising continuous estimation of motor speed during braking to permit a prompt return to positive torque production.

42. The method of claim 22 further comprising introducing loss-inducing commands in a rotating coordinate system, using a desired torque-pulsation frequency generally corresponding to a given torque-pulsation, so that the loss-inducing frequency actually applied to the motor automatically varies with the speed of the motor to maintain the difference between the normal and loss-inducing frequencies generally equal to the desired torque-pulsation frequency.

* * * * *